United States Patent [19]
Bales et al.

[11] Patent Number: 5,477,613
[45] Date of Patent: Dec. 26, 1995

[54] METHOD OF SIMULTANEOUSLY FORMING ROCKET THRUST CHAMBER COOLING TUBES

[75] Inventors: Daniel A. Bales, Palm City; James R. Joyce, Jupiter, both of Fla.

[73] Assignee: United Technologies Corporation, Hartford, Conn.

[21] Appl. No.: 213,306

[22] Filed: Mar. 14, 1994

Related U.S. Application Data

[63] Continuation-in-part of Ser. No. 171,086, Dec. 21, 1993, abandoned.

[51] Int. Cl.$^6$ ................................................ B23P 15/00
[52] U.S. Cl. ........................................ 29/890.01; 29/465
[58] Field of Search ........................... 29/890.01, 460, 29/465, 466, 469.5, 514; 239/1, 127.1, 127.3; 60/266, 267

[56] References Cited

U.S. PATENT DOCUMENTS

| | | | |
|---|---|---|---|
| 3,069,850 | 12/1962 | Ledwith et al. | 29/890.01 |
| 3,086,358 | 4/1963 | Tumavicus | 29/890.01 |
| 3,208,132 | 9/1965 | Escher | 29/890.01 |
| 3,349,464 | 10/1967 | Becker, Jr. et al. | 29/890.01 |
| 5,221,045 | 6/1993 | McAninch et al. | 239/1 |

*Primary Examiner*—Irene Cuda
*Attorney, Agent, or Firm*—Christopher T. Hayes

[57] ABSTRACT

A plurality of tubes are placed side-by-side on the forming surface of a die, another die is brought into contact with the tubes, thus sandwiching the tubes therebetween. The two dies are then placed into a press that forces the dies together, simultaneously deforming the tubes into intimate contact with each other, thereby producing an exacting fit between adjacent tubes.

20 Claims, 15 Drawing Sheets

METHOD OF SIMULTANEOUSLY FORMING ROCKET THRUST CHAMBER COOLING TUBES

The invention was made under a U.S. Government contract and the Government has rights herein.

This application is a continuation-in-part of U.S. Ser. No. 08/171,086 filed Dec. 21, 1993, now abandoned.

FIELD OF THE INVENTION

This invention is related to rocket thrust chambers and particularly to a process for forming the cooling tube liners used in such chambers.

BACKGROUND OF THE INVENTION

Rocket engines, such as those used on space missions, are costly to design and manufacture. In addition, there is a continuing and growing need for rockets capable of carrying payloads to space or near-Earth orbits. Consequently, manufacturers of such rocket engines are constantly seeking new ways to reduce the cost of producing the components which go into a rocket engine.

One such component is the rocket thrust chamber within which the propellants of the rocket engine are mixed, combusted and accelerated. Because of the extremely high temperatures of the propellants moving through the thrust chamber, the walls of the thrust chamber must be cooled in those applications which require sustained engine firings. Such cooling is typically accomplished by flowing a coolant through tubes or channels which form the inner surface of the thrust chamber.

A typical example of such thrust chambers is shown in U.S. Pat. No. 3,208,132 to Escher, which discloses a rocket chamber produced by forming coolant flow passages within two sheets by an explosive forming process. The formed sheets must be subsequently welded or brazed together to form individual flow passages, and the integrity of these welds is difficult to inspect. U.S. Pat. No. 3,190,070 to Neu discloses a rocket chamber cooling tube liner formed from a plurality of pre-formed coolant tubes that are inspectable, however, the tubes must be manufactured to close tolerances to ensure that the resulting brazed cooling tubes adequately shield the structural jacket of the chamber from the combustion products. Such tube forming typically requires multiple or progressive dies to produce each tube, and due to manufacturing tolerances, computers must often be used to select tubes (based on dimensions) from a large inventory of finished tubes to minimize tube-to-tube gaps in the cooling tube liner. The current method is thus both time consuming and labor intensive.

What is needed is a method of making a cooling tube liner which is simple, achieves the necessary tube-to-tube gap tolerances, is less labor intensive than the prior art, and is readily inspectable.

SUMMARY OF THE INVENTION

It is therefore an object of the present invention to provide a method for forming a cooling tube liners for rocket thrust chamber which provides for secure bonds between adjacent coolant tubes and a simple manufacturing technique.

Another object of the present invention is to provide a method that achieves the necessary tube-to-tube gap tolerances for rocket thrust chamber cooling tube liners and is less labor intensive than methods of the prior art.

Another object of the present invention is to provide a method that results in a cooling tube liner that is readily inspectable.

According to the present invention, a plurality of tubes are placed side-by-side on the forming surface of a die, another die is brought into contact with the tubes, thus sandwiching the tubes therebetween, and the two dies are placed into a press that forces the dies together, simultaneously deforming the tubes into intimate contact with each other, thereby producing an exacting fit between adjacent tubes. The relative positions of the tubes are then noted, and the tubes are placed on a bonding fixture in the same relative positions for bonding.

The foregoing and other features and advantages of the present invention will become more apparent from the following description and accompanying drawings.

BEST MODE FOR CARRYING OUT THE INVENTION

Figure 1:
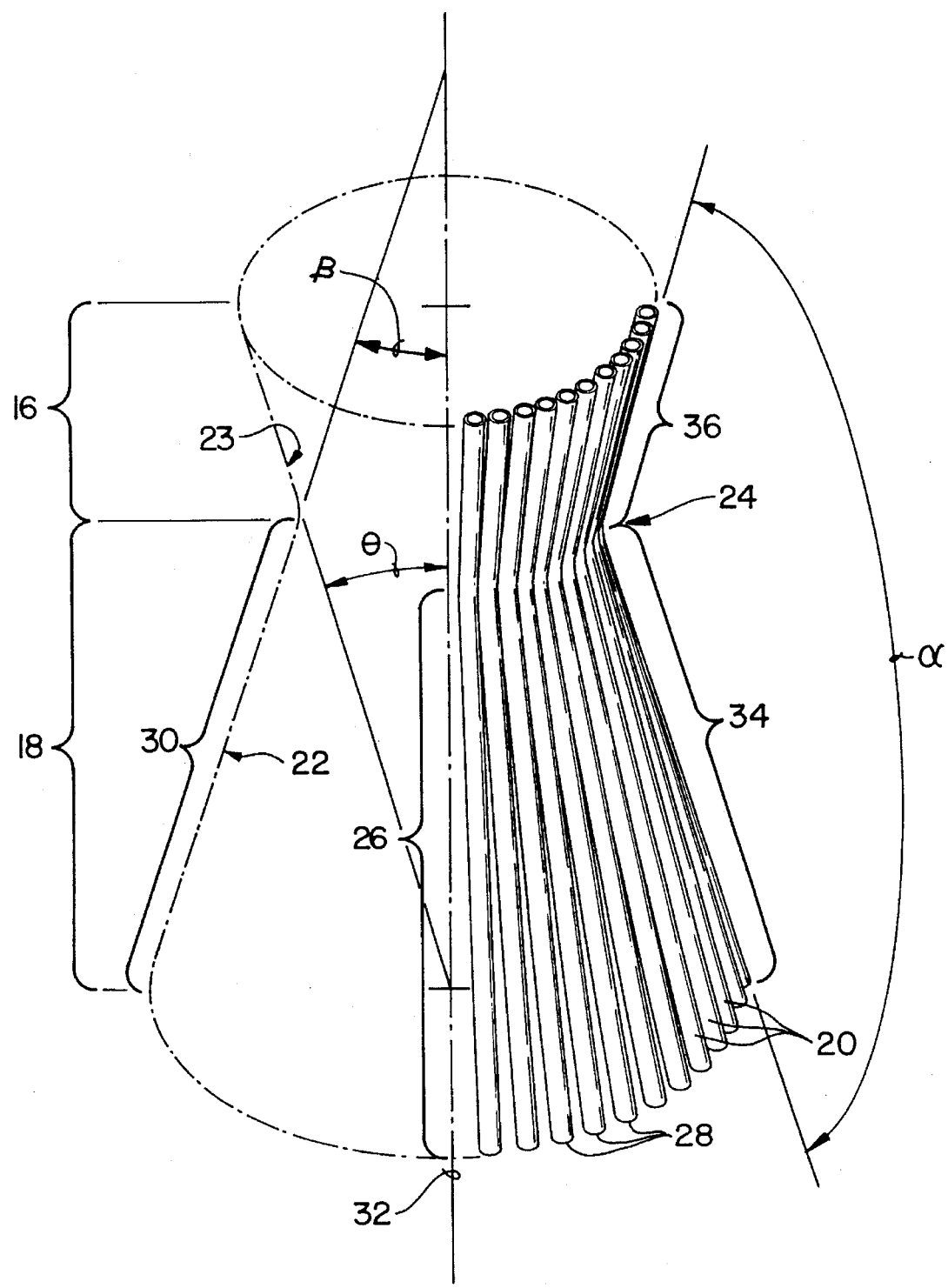
FIG. 1 is a perspective view showing the tubes used in the method of the present invention with respect to an outline of a convergent/divergent rocket thrust chamber in which the tubes will ultimately be used.
Figure 2:
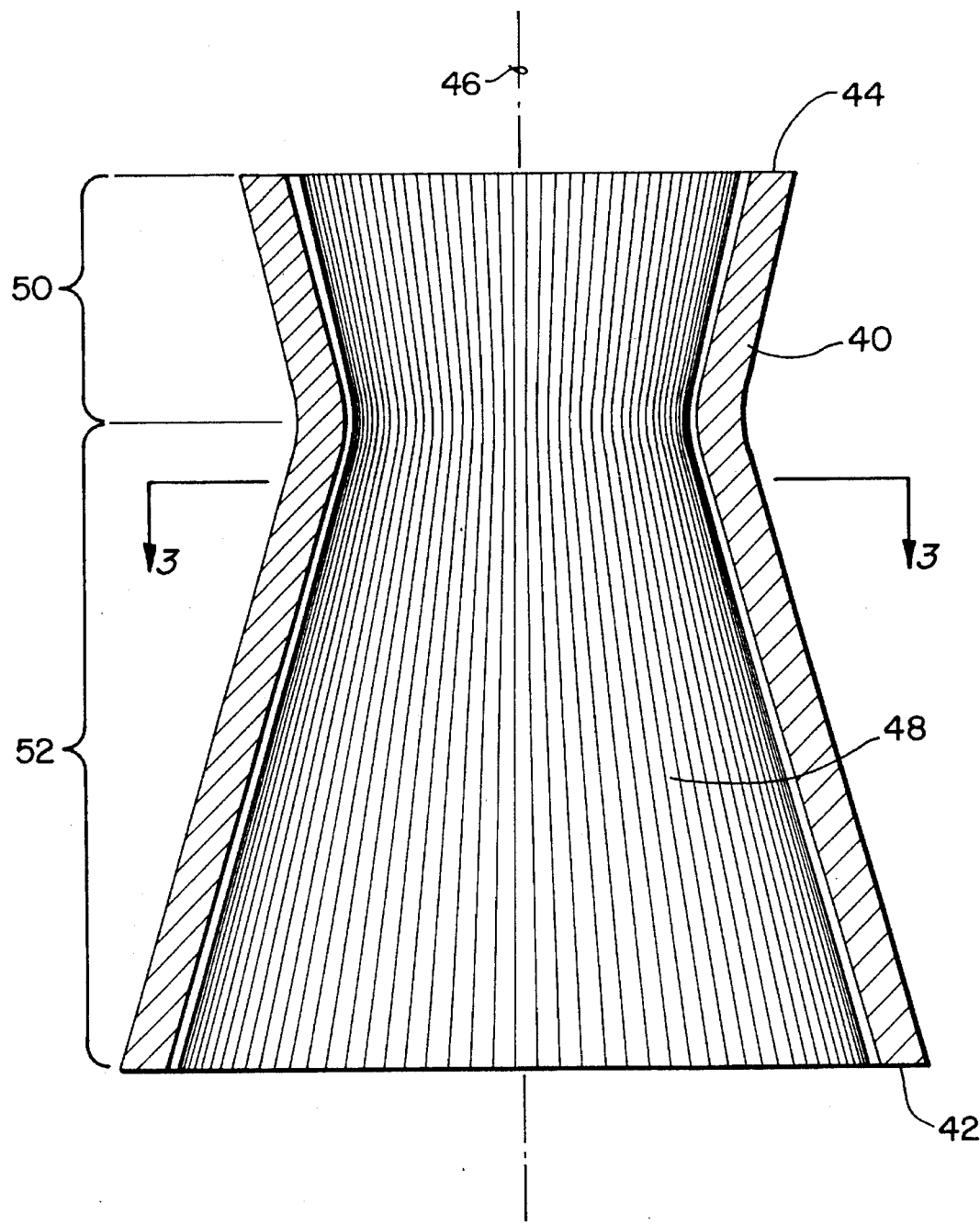
FIG. 2 is a cross-sectional view of the outer die used in the preferred method of the present invention.

The preferred embodiment of the present invention discloses a method for forming a cooling tube liner of the type used on a convergent/divergent rocket thrust chambers, such as are incorporated into rocket chambers for the RL-10, a rocket engine manufactured by the Pratt & Whitney division of United Technologies Corporation. As used herein, the term "rocket thrust chamber" refers to the rocket engine combustion chamber 16 (in which the combustion products are formed) and/or the rocket engine nozzle extension 18 (within which the combustion products are expanded and accelerated). Referring to FIG. 1, practicing the invention requires a plurality of tubes 20, all of the same length, and each long enough to span the full axial length of the inner face 22 of the thrust chamber (shown in phantom in FIG. 1) of the rocket engine in which the cooling tube liner is to be used (i.e. the entire inner face of the converging section 16 and the diverging section 18 of the thrust chamber). Each tube must also initially include a bend 24 at a predetermined length 26 from one end 28, that length 26 being the length 30 of the inner face 22 of the diverging section 18 of the thrust chamber. As those skilled in the art will readily appreciate, the bend 24 occurs at what will be the throat of the convergent divergent rocket thrust chamber. The angle $\alpha$ of the bend 24 is predetermined by reference angles $\beta$ and $\theta$. Reference angle $\beta$ of the diverging section 18 of the convergent/divergent thrust chamber is equal to the included angle between the axis 32 of the thrust chamber and the face 22 of the divergent section (i.e. the divergence angle). Reference angle $\theta$ of the converging section 16 of the convergent/divergent thrust chamber is equal to the included angle between the axis 32 of the thrust chamber and the face 23 of the convergent section (i.e. the convergence angle). The angle $\alpha$ is approximately equal to $180°-(\beta+\theta)$, where $\beta$ and $\theta$ are measured in degrees. The purpose of the bend 24 is to minimize the likelihood that the tubes 20 will become crimped closed at the throat of the convergent/divergent rocket thrust chamber during the process described below. As those skilled in the art will readily appreciate, the closer angle $\alpha$ approximates $180°-(\beta+\theta)$ the less bending of the tubes 20 that is necessary in this process, thereby reducing the danger of crimping the tubes 20. Each bend 24 thus divides the respective tube 20 into a first substantially straight portion 34 and a second substantially straight portion 36, and the two portions 34, 36 are joined at the bend 24 at the predetermined angle $\alpha$. The purpose of the bend 24 is discussed in greater detail below. $\theta$ The tubes may be non-precision tubes, however the tubes should be pressure tested and inspected for wall thickness and surface imperfections prior to practicing the present invention.

Figure 3:
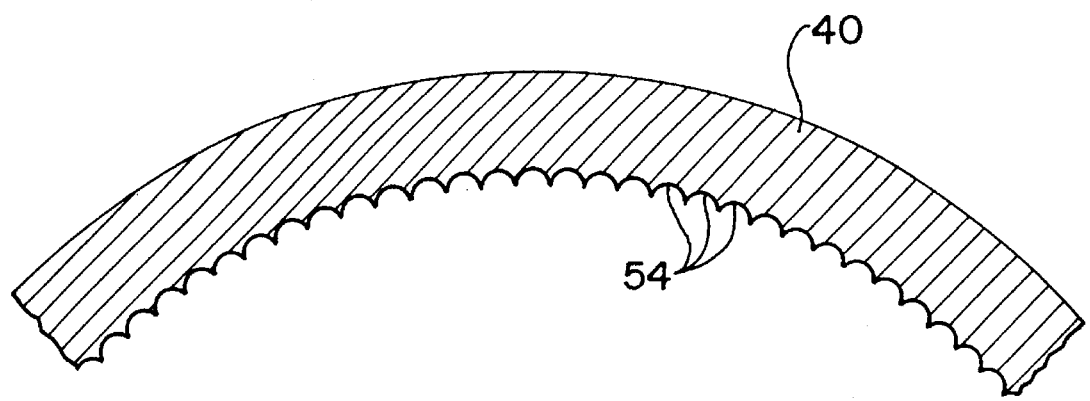
FIG. 3 is a cross-sectional view of the outer die taken along line 3—3 of FIG. 2.

Forming of the tubes 20 is accomplished with an inner die 38 and an outer die 40, as shown in FIGS. 2–5. The outer die 40 has first 42 and second 44 axial ends and a centerline axis 46 defined therethrough. The outer die 40 also has an inner surface 48 facing the centerline axis 46 and the inner surface 48 extends between the first and second axial ends 42, 44 of the outer die 40. The inner surface 48 of the outer die 40 defines a converging section 50 coaxial with the centerline axis 46, and a diverging section 52 that is coaxial with the centerline axis 46 and integral with the converging section 50. The outer die 40 is made up of a plurality of segments, preferably four, which extend axially along the centerline axis 46. Each segment also extends radially about the centerline axis 46 forming an arc equal to one fourth of the circumference of the outer die 40. The outer die 40 has several sets of fasteners, preferably bolts (not shown), for removably securing each of the segments to adjacent segments. Segmented outer dies fastened together with bolts are well known in the art and the specifics of such outer dies are therefore beyond the scope of this invention. As shown in FIG. 3, the inner surface 48 is preferably fluted, having a plurality of troughs 54 extending between the first and second axial ends 42, 44 of the outer die 40, with the quantity of troughs 54 equal to the quantity of tubes 20.

Figure 4:
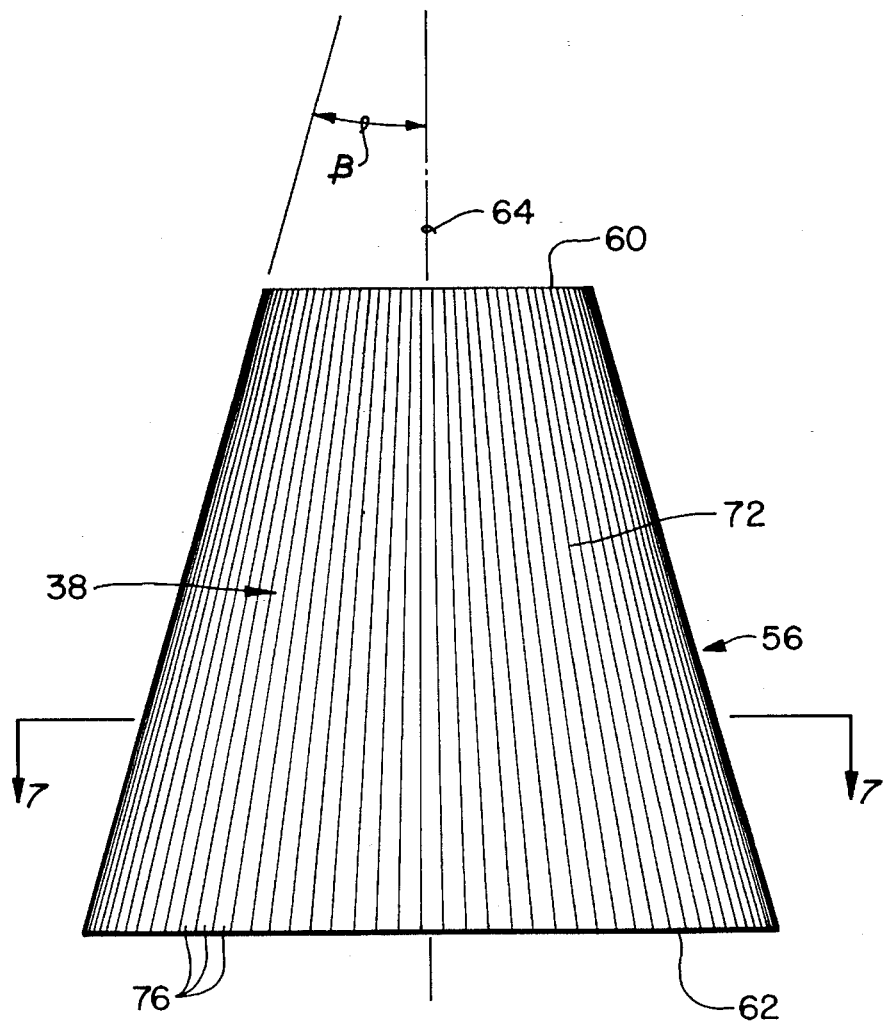
FIG. 4 is a view of the diverging piece of the inner die used in the preferred method of the present invention.

The inner die 38 comprises a diverging piece 56 and a converging piece 58. The diverging piece 56 is somewhat conically shaped, generally defining a truncated cone, and having first 60 and second 62 axial ends and a first longitudinal axis 64 defined therethrough, as shown in FIG. 4. The first axial end 60 of the diverging piece 56 defines the narrowest diameter of the diverging piece 56 along the first longitudinal axis 64 (i.e. the truncated tip of the truncated cone).

Figure 7:
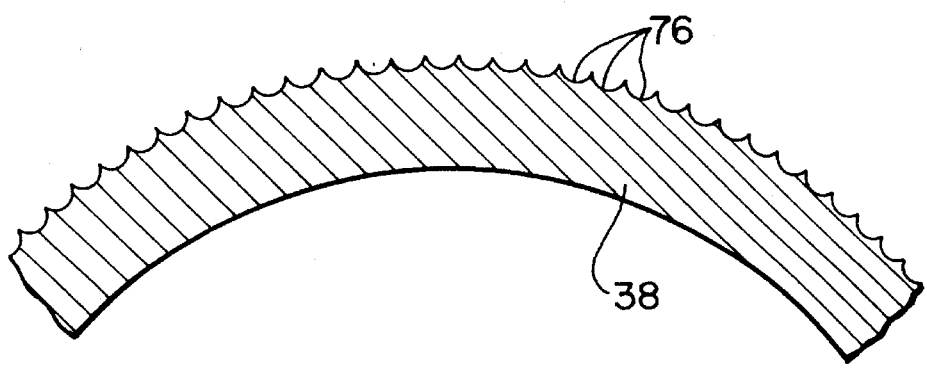
FIG. 7 is a cross-sectional view of the inner die taken along line 7—7 of FIG. 4.
Figure 5:
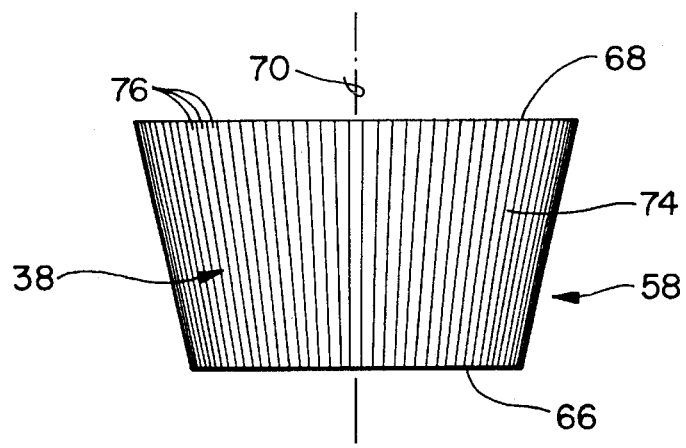
FIG. 5 is a view of the converging piece of the inner die used in the preferred method of the present invention.
Figure 6:
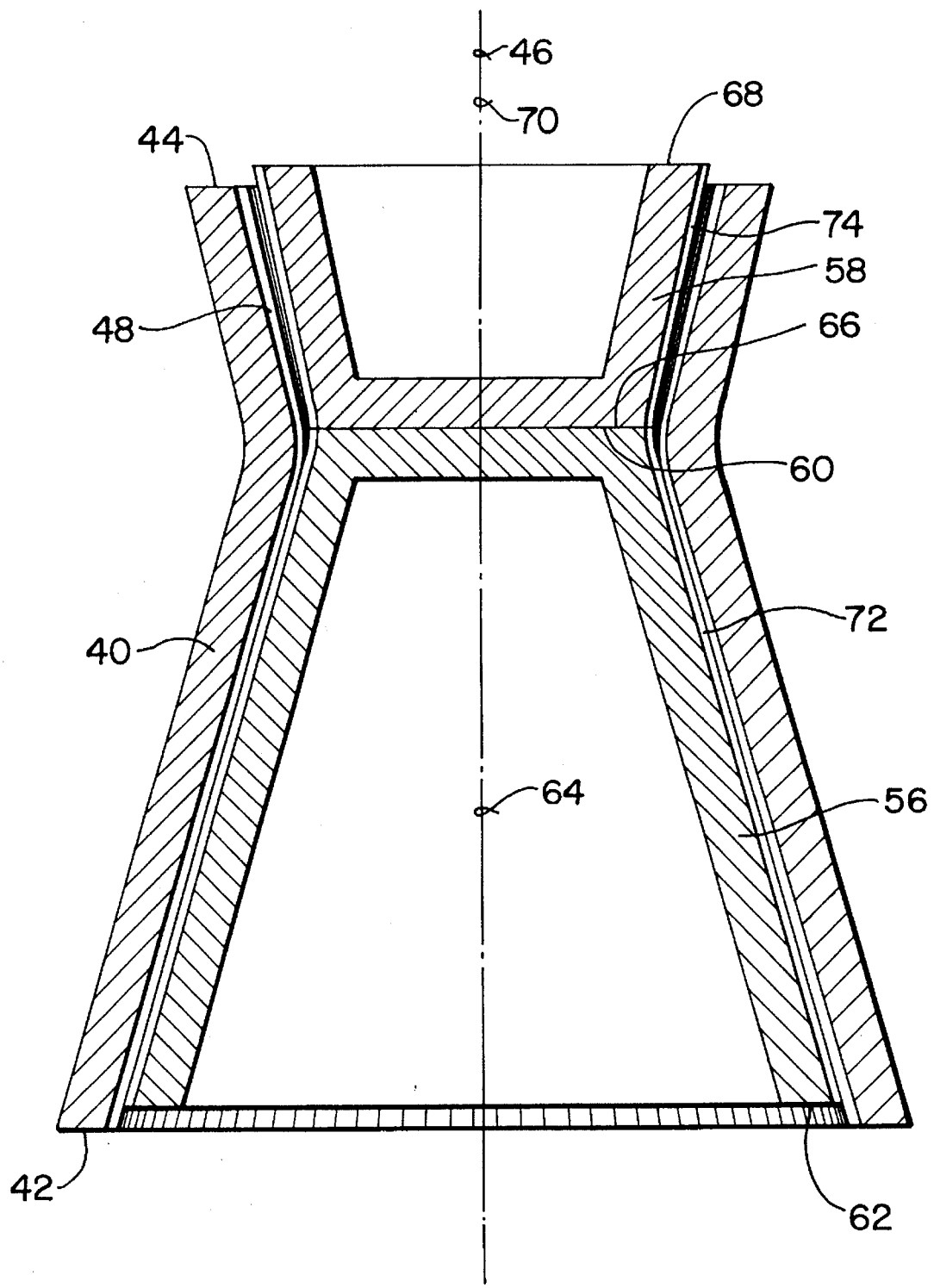
FIG. 6 is a cross-sectional view of the die assembly including the inner and outer dies of FIGS. 2, 4 & 5.

The converging piece 58 likewise generally defines a truncated cone having first 66 and second 68 axial ends and a second longitudinal axis 70 defined therethrough, as shown in FIG. 5. The first axial end 66 of the converging piece 58 defines the narrowest diameter of the converging piece 58 along the second longitudinal axis 70. The diverging and converging pieces 56, 58 are sized so as to be receivable into the voids of the diverging and converging sections 52, 50, respectively, of the outer die 40 such that the first end 60 of the diverging piece 56 contacts the first end 66 of the converging piece 58 when the diverging and converging pieces 56, 58 are placed within the outer die 40, as shown in FIG. 6. The outer surfaces 72, 74 of the diverging and converging pieces 56, 58 are preferably also fluted, as shown in FIG. 7, comprising a plurality of troughs 76 extending between the first 60, 66 and second 62, 68 axial ends thereof, and equal in quantity to the plurality of tubes 20. Each of the troughs 76 of the converging piece 58 is oriented at the same reference angle $\theta$ (i.e. convergence angle) relative to the second longitudinal axis 70 as discussed above, and each of the troughs 76 of the diverging piece 56 is oriented at the same reference angle $\beta$ (i.e. divergence angle) relative to the first longitudinal axis 64 as discussed above. The inner surface 48 of the outer die 40, and the outer surfaces 72, 74 of the diverging and converging pieces 56, 58 are preferably coated with a dry film lubricant such as boron nitride, yttrium oxide, or molybdenum disulfide, to provide a lubricious surface for the tubes 20 to slide against during the forming operation.

Although the forming surfaces—the inner surface 48 of the outer die 40, the outer surface 72 of the diverging piece 56, and the outer surface 74 of the converging piece 58—are shown and described as being fluted, those skilled in the art will readily appreciate that any of these surfaces 48, 72, 74 may have either a smooth machined contour or a fluted configuration. If the design requires greater surface area, a catenary or rounded tube wall may be desirable. Depending on whether smooth contours or fluted contours are chosen for the various forming surfaces, the tooling described herein can provide for a variety of tubular walled configurations (catenary outside and inside walls, catenary inside and smooth outside walls, smooth inside and outside walls, etc.). Of course, in order to accommodate such configurations, the final tube shape must be accounted for in the shape of the forming surfaces 48, 72, 74 of the inner and outer dies 38, 40.

Figure 8:
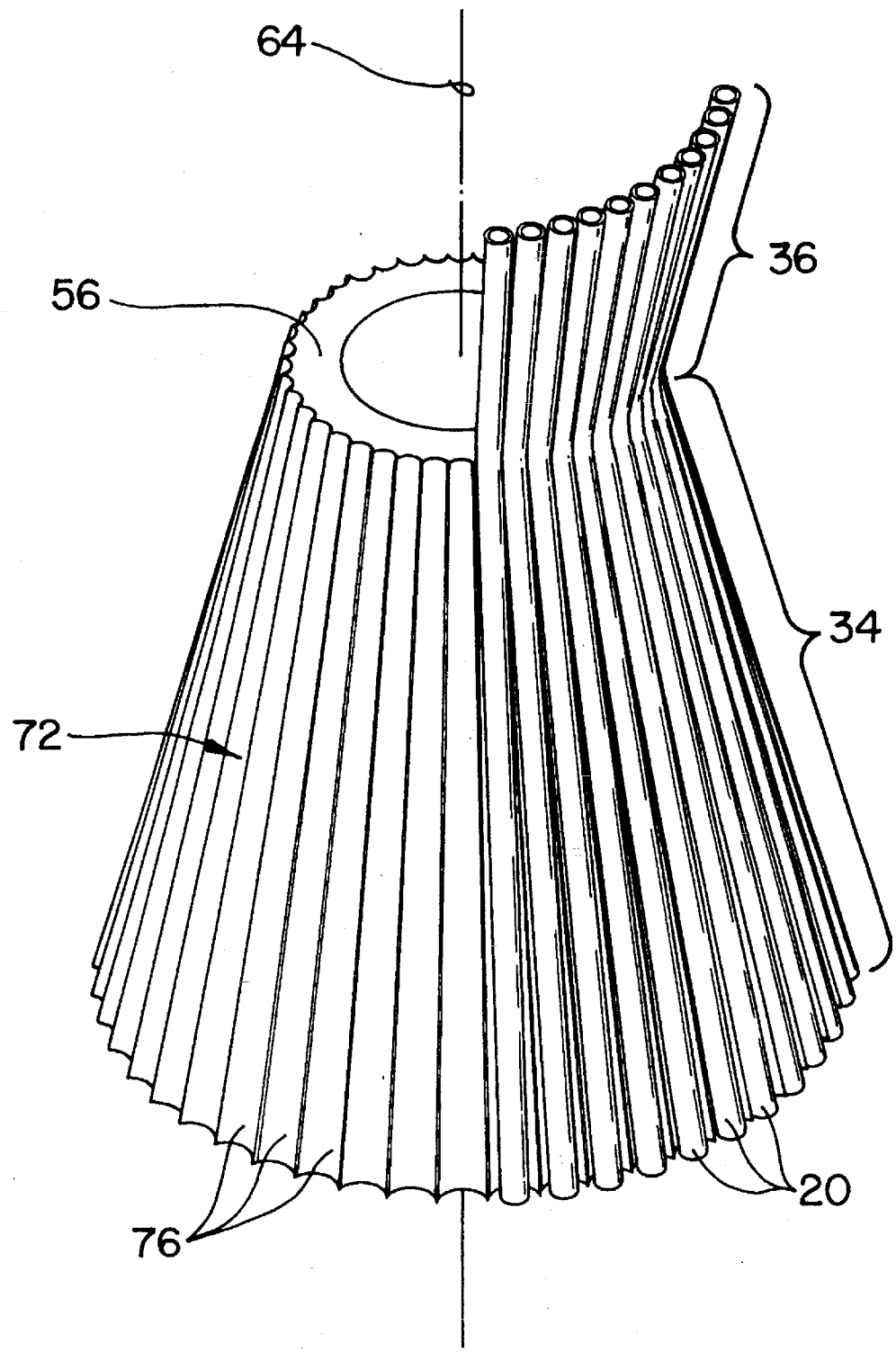
FIG. 8 is a perspective view of the diverging piece of the inner die showing the bent tubes in the troughs thereof.
Figure 9:
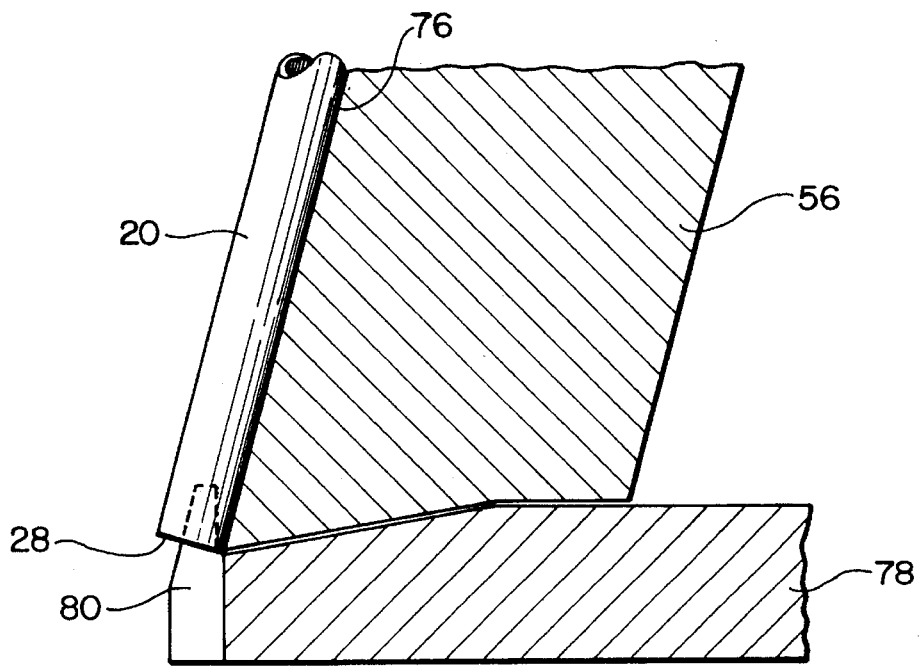
FIG. 9 is a partial, cross-sectional view of the diverging piece of the inner die showing the relative positions of the first retaining ring and the tubes.

The tubes 20 are positioned onto the diverging piece 56 with the first substantially straight portion 34 of each tube 20 located in one of the troughs 76 of the diverging piece 56, and with the second substantially straight portion 36 of each tube 20 substantially parallel to the first longitudinal axis 64, as shown in FIG. 8. Referring to FIG. 9, each of the tubes 20 is retained within one of the troughs 76 of the outer surface 72 of the diverging piece 56 by a first retaining ring 78 that preferably is removably secured by bolts (not shown) to the second end 62 of the diverging piece 56. The first retaining ring 78 has a plurality of retaining pins 80 equal to the quantity of tubes 20, and each pin 80 is inserted into and received within one end 28 of one of the tubes 20 as shown in FIG. 9.

Figure 10:
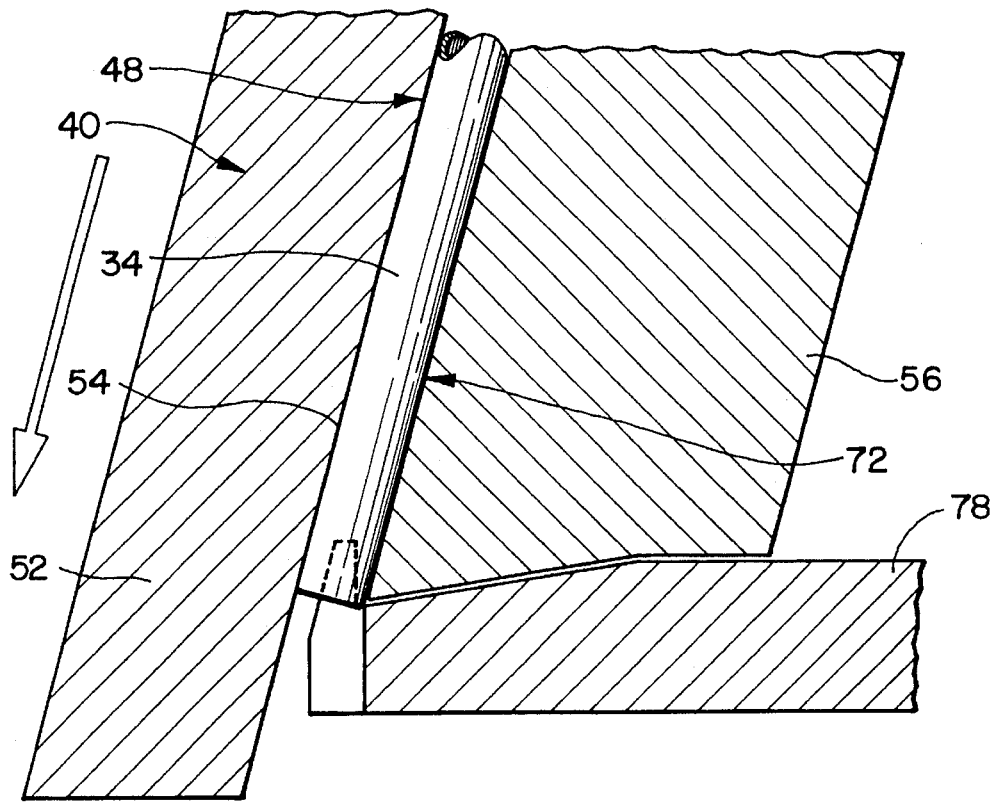
FIG. 10 is the view of FIG. 9 additionally showing the relative position of the diverging section of the outer die.
Figure 11:
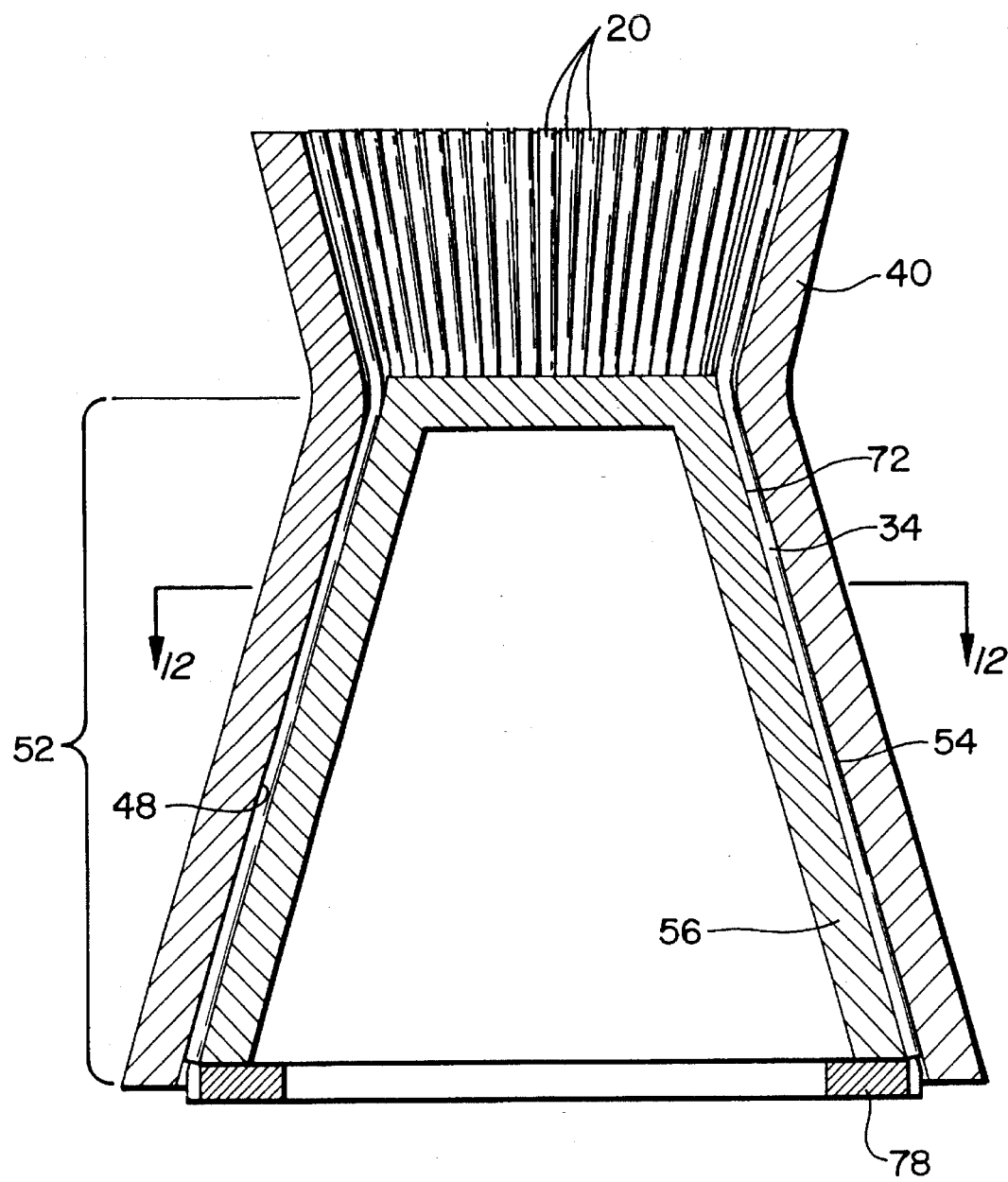
FIG. 11 is the die assembly of FIG. 6, additionally showing the tubes positioned around the diverging piece and the first retaining ring retaining the tubes.
Figure 12:
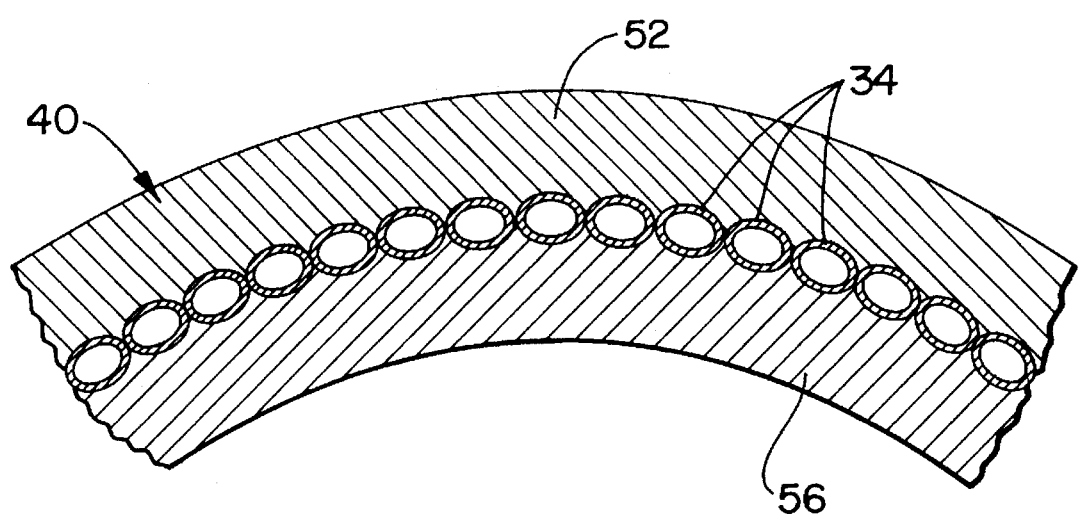
FIG. 12 is a cross-sectional view taken along line 12—12 of FIG. 11 and showing the diverging piece, the diverging section, and the ovalized tubes with the tube-to-tube gaps eliminated.
Figure 13:
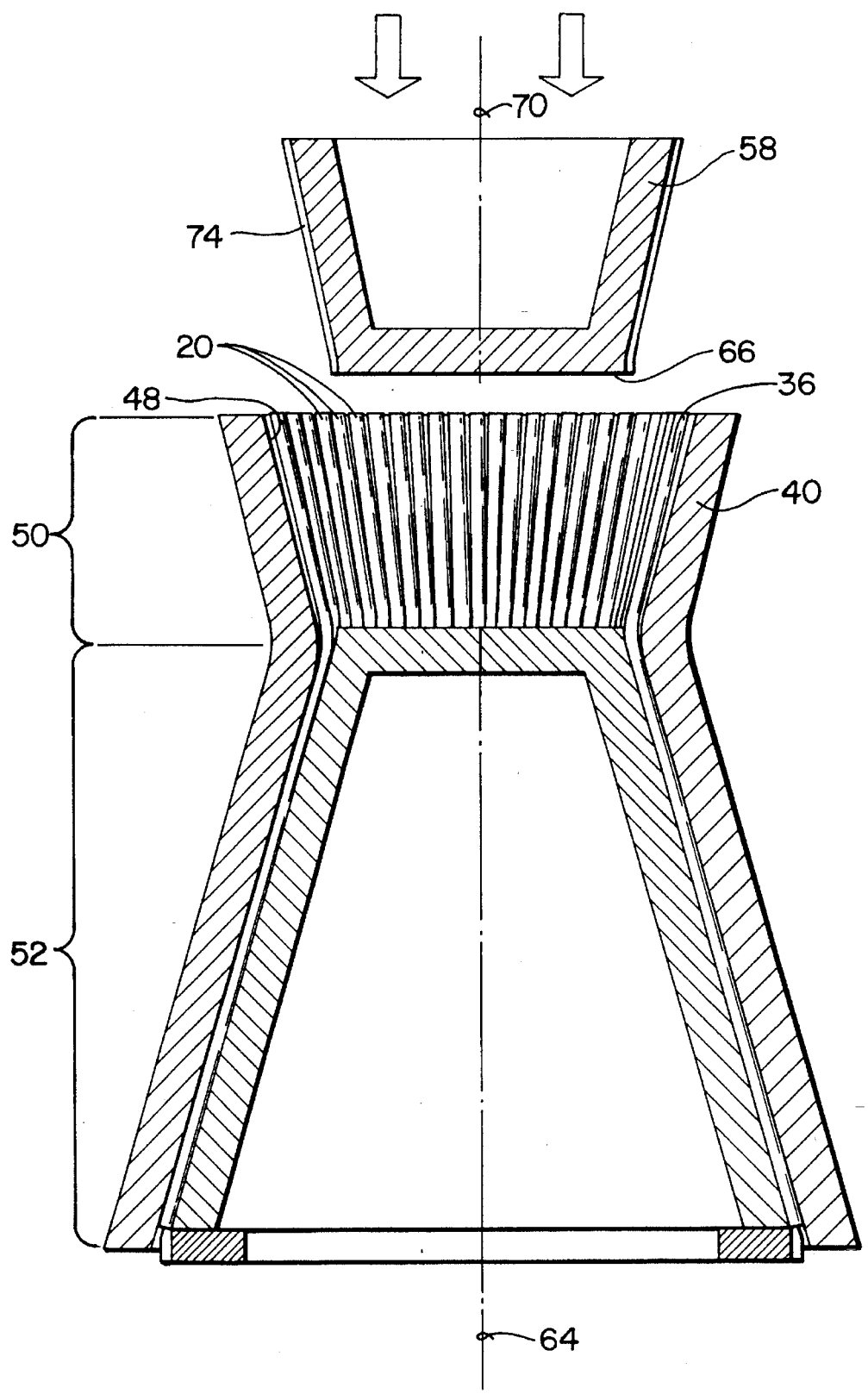
FIG. 13 is a view of the assembly shown in FIG. 11, additionally showing the converging piece aligned with the diverging piece.
Figure 14:
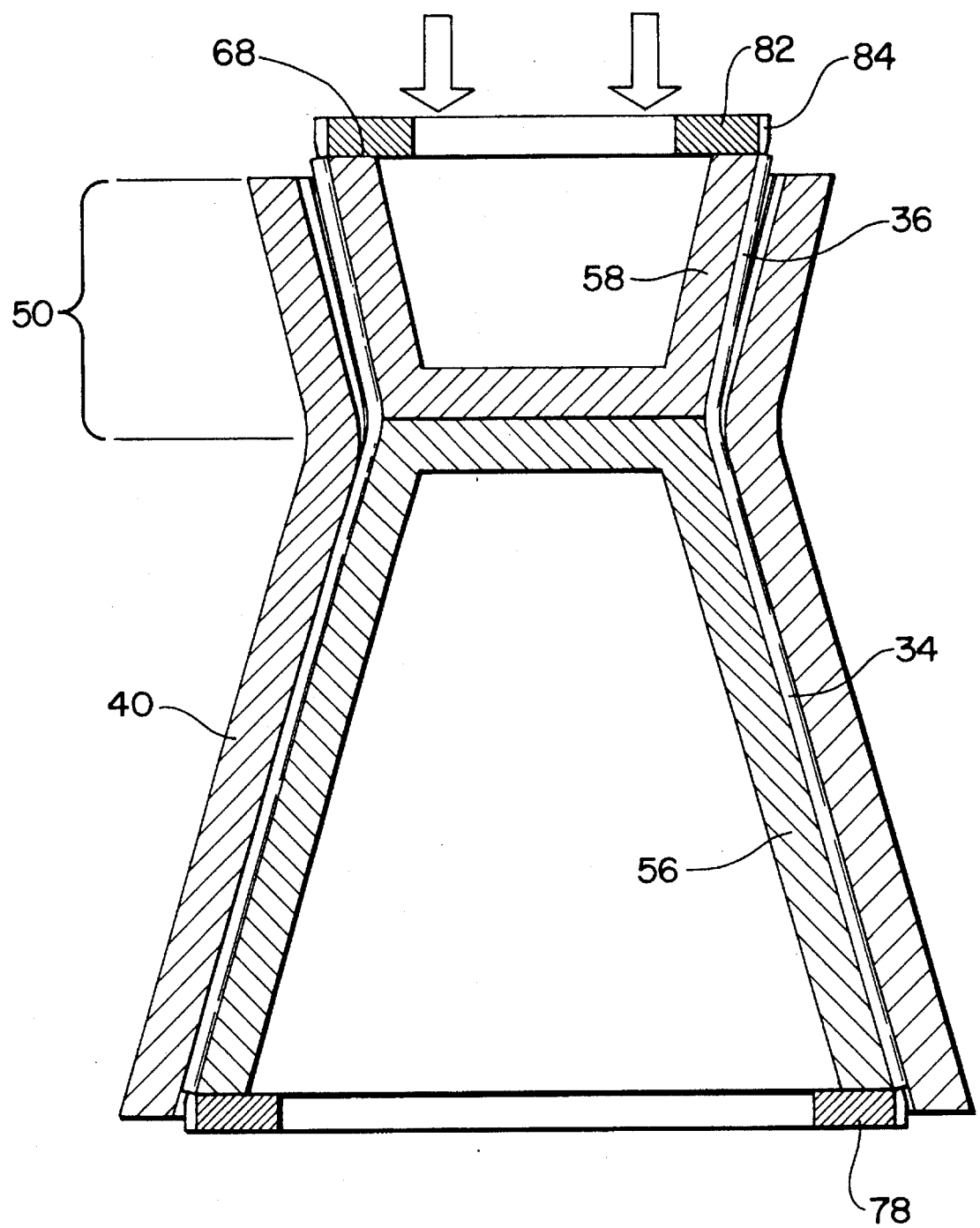
FIG. 14 is a view of the assembly shown in FIG. 12, additionally showing second retaining ring retaining the tubes.
Figure 15:
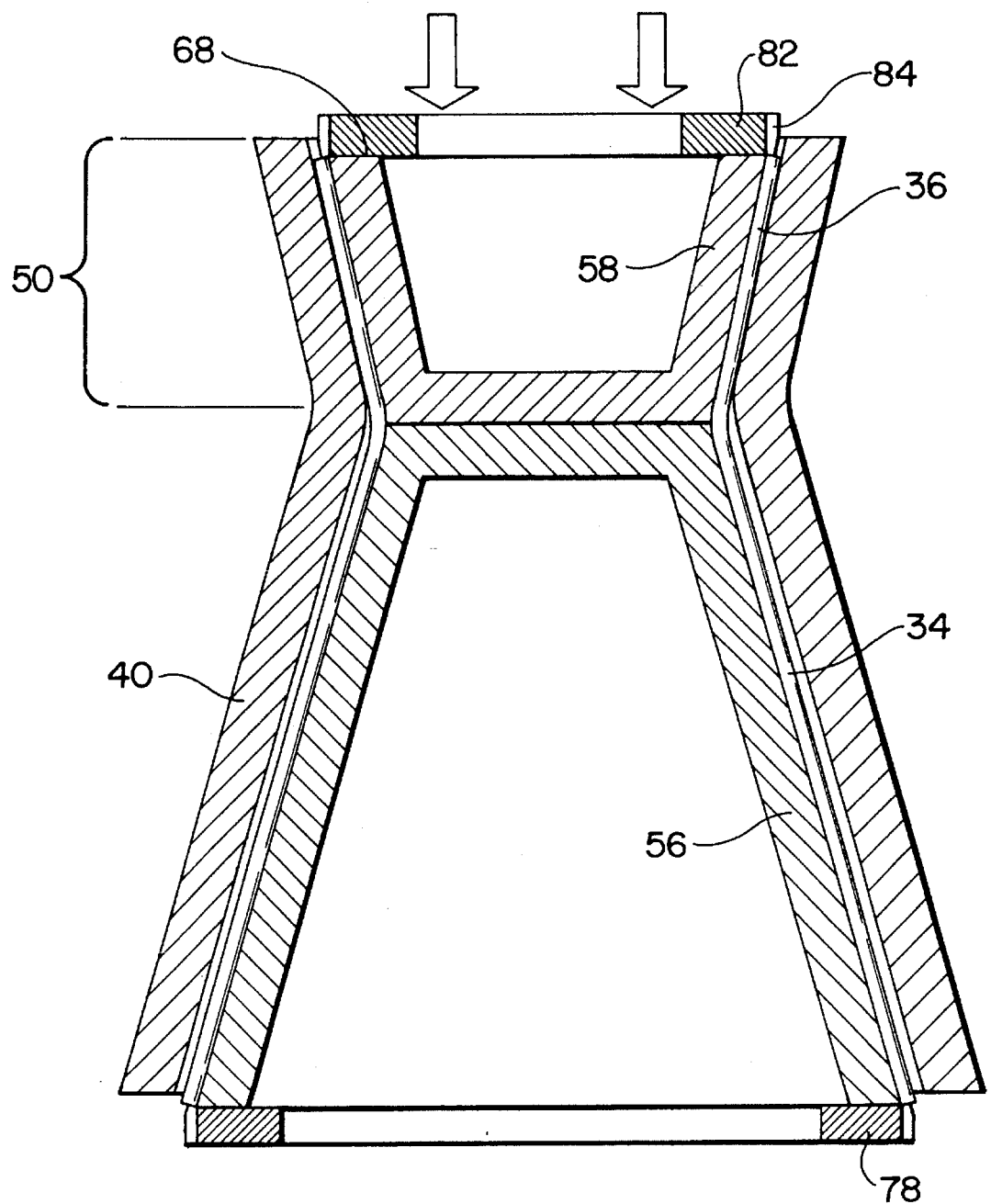
FIG. 15 is a view of the assembly shown in FIG. 14 after the converging piece has been forced into the converging section of the outer die and displaced the diverging piece.

After positioning the tubes 20 onto the diverging piece 56 and the first retaining ring 78, the segments of the outer die 40 are fastened about the constrained set of tubes 20 so that the first substantially straight portion 34 of each tube 20 is positioned within one of the troughs 54 of the diverging section 52 of the inner surface 48, and each of the second substantially straight portions 36 is aligned with the immediately adjacent trough 54 of the converging section 52 of the inner surface 48. At this point, the first substantially straight portion 34 of each tube 20 is sandwiched between the outer surface 72 of the diverging piece 56 and the diverging section 52 of the inner surface 48 of the outer die 40, as shown in FIG. 10. The entire assembly (see FIG. 11) is then placed in a press or other manufacturing tool which is capable of causing an axial displacement of the diverging and converging pieces 56, 58 relative to the outer die 40. The diverging piece 56 is then forced into the diverging section 52 of the outer die 40 until each tube 20 is deformed into intimate contact with the immediately adjacent tubes 20 along the entire length 26 of the first substantially straight portion 34 thereof. The force must be great enough to cause simultaneous deformation of the tubes 20 (generally in the form of ovalization), resulting in the elimination of all gaps between immediately adjacent first substantially straight portions 34 of the tubes 20, as shown in FIG. 12. The first end 66 of the converging piece 58 is then inserted into the converging section 50 of the outer die 40 by aligning the second longitudinal axis 70 with the first longitudinal axis 64 and forcing the second piece 58 axially into the converging section 50 of the outer die 40, as shown in FIG. 13, thereby sandwiching the second substantially straight portions 36 of each of the tubes 20 between the inner surface 48 and the outer surface 74 of the converging piece 58, with each of the second substantially straight portions 36 positioned within one of the troughs 54 of the converging section 50 of the inner surface 48 and in one of the troughs 76 of the outer surface 74 of the converging piece 58. A second retaining ring 82 is then removably secured to the second end 68 of the converging piece 58. The second retaining ring 82 is similar to the first retaining ring 78, having a plurality of retaining pins 84 equal to the quantity of tubes 20, and each pin 84 is received within one end of one of the tubes 20. As shown in FIG. 14, the converging piece 58 is then forced axially into the converging section 50 of the outer die 40, displacing the first piece 56 as shown in FIG. 15, until each tube 20 is deformed into intimate contact with the immediately adjacent tubes 20 along the entire length of the second substantially straight portion 36 thereof. The converging piece 58 is then removed from the converging section 50, and each of the tubes 20 is marked to identify the position of each tube 20 relative to the other tubes 20. The diverging piece 56 is then removed from the diverging section 52, and the tubes 20 are removed from the outer die 40. The tubes 20 are removed from the tooling, cleaned, inspected, re-cleaned, and then re-stacked onto a rocket chamber/nozzle bonding fixture for subsequent bonding.

A bonding fixture, preferably a brazing fixture such as the type commonly used in the art for brazing cooling tube 20 liners, is used to bond the tubes 20 together. Each tube 20 is positioned onto the fixture in the same relative position the tubes 20 had when removed from the outer die 40. The tubes 20 are positioned with each tube 20 in intimate contact with each adjacent tube 20 along the entire length thereof. The relative positions of the tubes 20 are then maintained by additional brazing fixtures while brazing each tube 20 to the immediately adjacent tubes 20. Upon cooling, the brazed tubes 20 are removed from the brazing fixture as a single cooling tube 20 liner.

The extremely close fit between tubes 20 obtained by this method permits the use of low cost nickel-silicon-chromium braze alloys for subsequent brazing if so desired. The nickel alloy brazes offer greater tensile strengths at temperature than conventional precious metal brazes, but at a fraction of the cost ($20/ounce versus $400/ounce). Although brazing is the preferred bonding process of the present invention, the tubes 20 can also be readily inflation formed and diffusion bonded. If inflation diffusion bonding is utilized, the close fits afforded by the method of the present invention minimizes the thinning of the tubes 20 as they are pressurized to expand into one another. Since the tubes 20 have already been formed against one another before the tubes 20 are pressurized, minimal movement has to occur, resulting in minimal thinning of the tube 20 wall.

Figure 16:
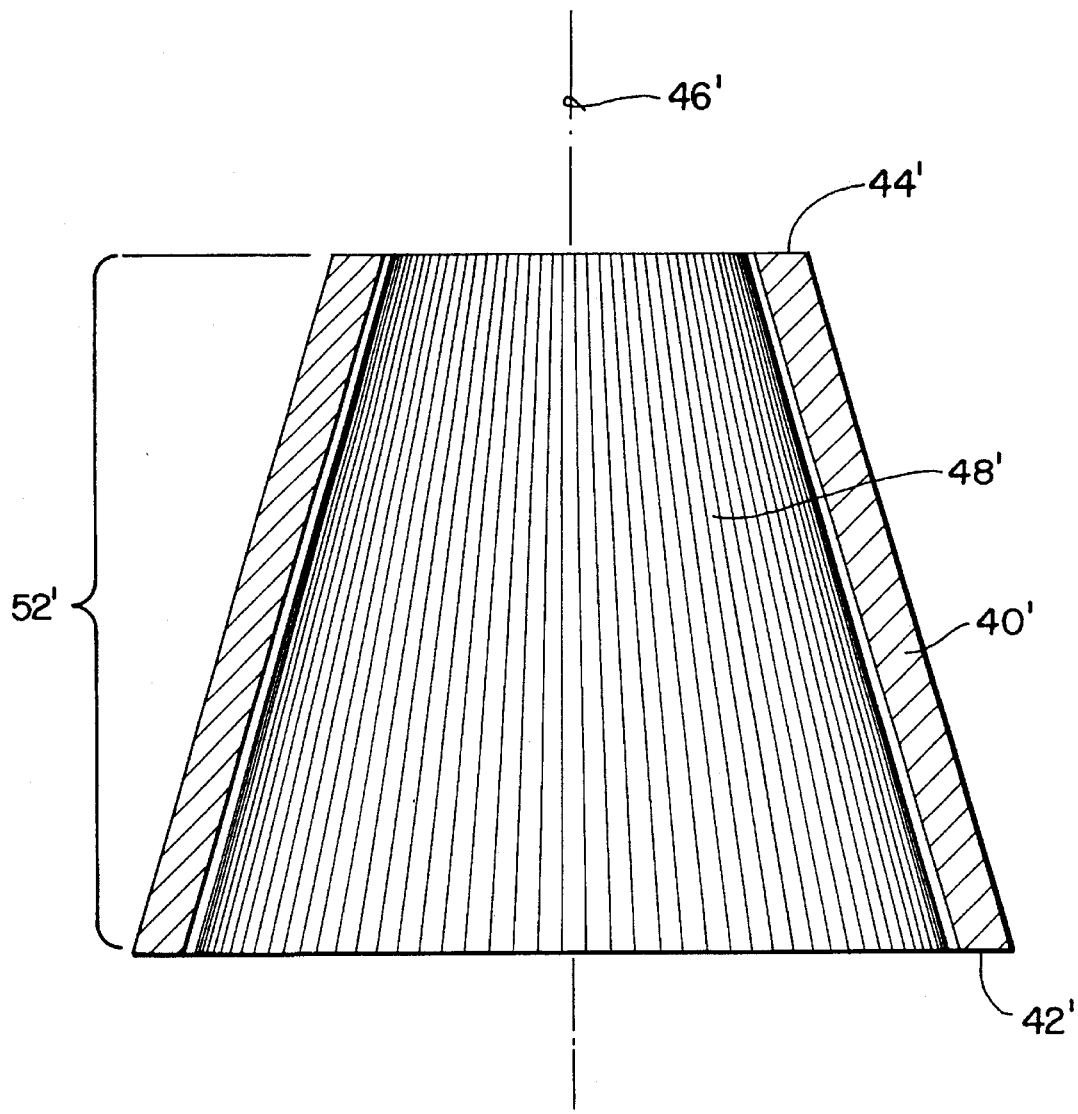
FIG. 16 is a cross-sectional view of the outer die used in the alternate method of the present invention.

Some rocket engine applications may incorporate cooling tube 20 liners only in the divergent section of the thrust chamber. For those applications, an alternative method of the present invention may be utilized. The alternative embodiment is similar to the preferred embodiment, and comprises providing a plurality of cooling tubes 20 all of the same length, and inspected as described for the preferred embodiment. However, the tubes 20' need not incorporate the bend 24 described above. As shown in FIG. 16, the outer die 40' has a centerline axis 46' defined therethrough and first 42' and second 44' axial ends, a fluted inner surface 48' facing the centerline axis 46' and extending between the first and second ends 42', 44', but the inner surface 48' defines only a diverging section 52' coaxial with the centerline axis 46'. The inner die 38' comprises a diverging piece 56' similar to the diverging piece 56 described for the preferred embodiment, as shown in FIG. 17, and the forming surfaces 48', 72' are coated with a dry film lubricant.

Figure 17:
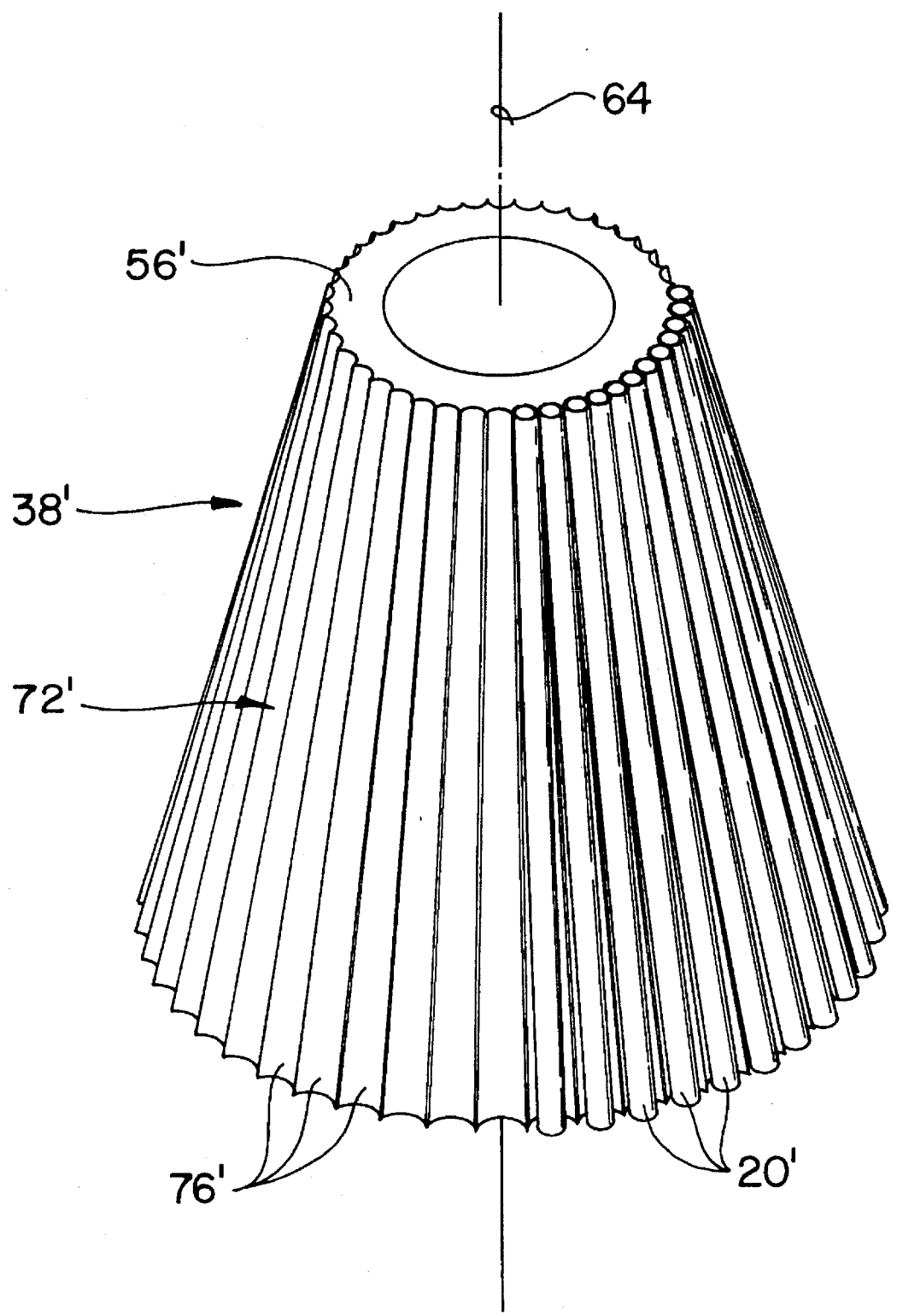
FIG. 17 is a perspective view of the diverging piece of the inner die showing the straight tubes in the troughs thereof.
Figure 18:
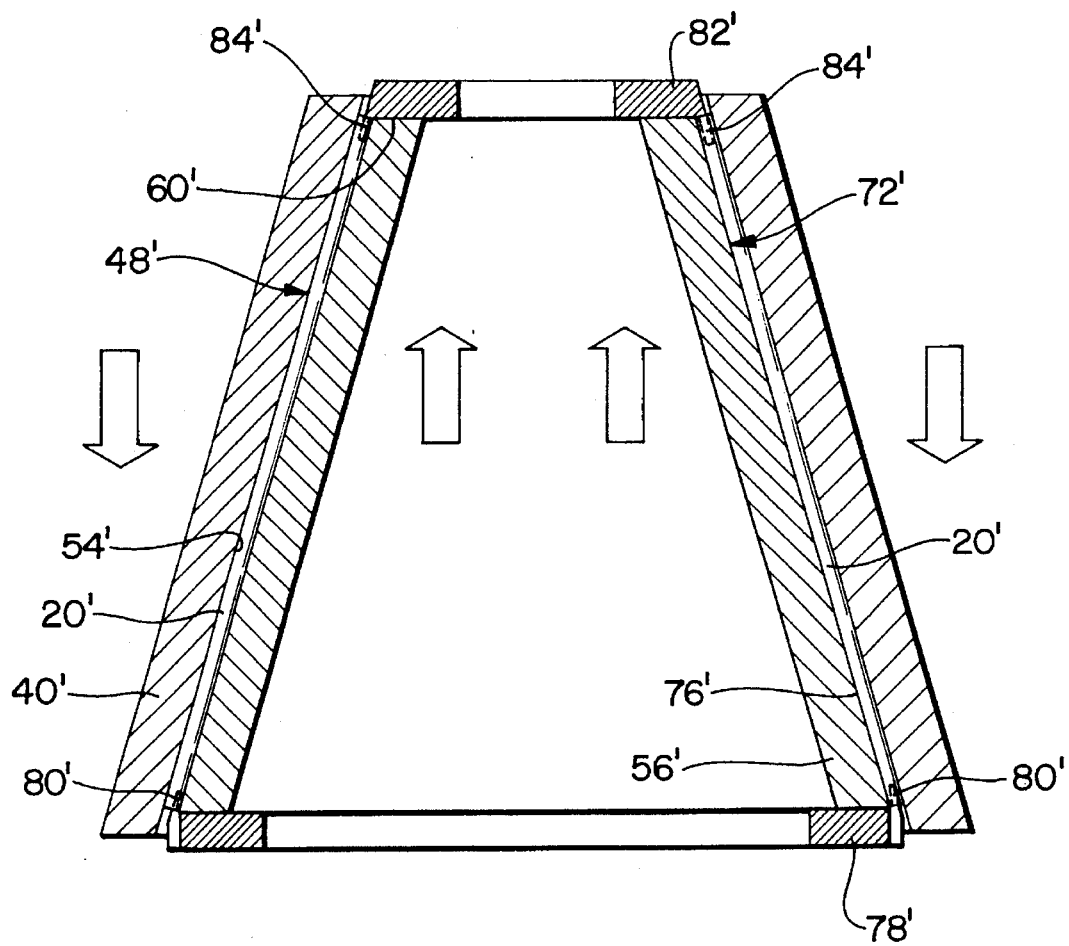
FIG. 18 is a cross-sectional view of the diverging piece, outer die, tubes, and retaining rings during tube forming using the alternate method of the present invention.

Each tube 20' is positioned into one of the troughs 76' of the outer surface 72' of the diverging piece 56', as shown in FIG. 17, and each of the tubes 20 is retained within that trough 76' by the first and second retaining ring 78', 82', as shown in FIG. 18. The first retaining ring 78' is similar to that described for the preferred embodiment, but the second retaining ring 82' is removably secured to the first end 60' of the diverging piece 56'. The second retaining ring 82' has a plurality of retaining pins 84' equal to the quantity of tubes 20', and each pin 84' is inserted into and received within one end of one of the tubes 20'.

After positioning the tubes 20' onto the diverging piece 56' and the pins 80' of the first retaining ring 78', and attaching the second retaining ring 82' to the diverging piece 56', the outer die 40' is lowered onto the constrained set of tubes 20' so that each tube 20' is positioned within one of the troughs 54' of the diverging section of the inner surface 48', sandwiching each tube 20' between the outer surface 72' of the diverging piece 56' and the diverging section of the inner surface 48' of the outer die 40', as shown in FIG. 18. The entire assembly is then placed in a press, and the diverging piece 56' is forced into the diverging section of the outer die 40' until each tube 20' is deformed into intimate contact with the immediately adjacent tubes 20' along the entire length thereof. The outer die 40' is then removed from the diverging piece 56', and each of the tubes 20' is marked to identify the position of each tube 20' relative to the other tubes 20'. The tubes 20' are then removed from the diverging piece 56', cleaned, inspected and bonded as described for the preferred embodiment of the present invention.

The method of the present invention simultaneously forms an entire set of tubes required for a single cooling tube liner, thus eliminating multiple or progressive dies currently used to conventionally manufacture rocket thrust chamber cooling tube liners, thereby eliminating much of the labor that is necessary to operate multiple dies. The intimate fit-up obtained with the method of the present invention allows the tubes to be readily bonded, assuring that brazing cycle time will be minimized. The elimination of tube-to-tube gaps for an entire set of tubes eliminates the need for a computer to select specific tubes from a large inventory of finished tubes, and the bonds of the finished cooling tubes are readily inspectable.

We claim:

1. A method of forming cooling tube liners for a rocket thrust chamber, said method comprising:

providing a plurality of cooling tubes, each of said plurality of tubes having the same length, each of said tubes having a bend at a predetermined length from one end of said tube, said bend dividing the tube into first and second substantially straight portions, said first and second substantially straight portions joined at the bend thereof at a predetermined angle;

providing a first die having a centerline axis defined therethrough and first and second axial ends, an inner surface facing said centerline axis, said inner surface extending between said first and second axial ends of said first die, said inner surface defining a converging section coaxial with the centerline axis and a diverging section coaxial with the centerline axis, said diverging section integral with said converging section;

providing a second die comprising first and second pieces, said first piece generally defining a truncated cone having first and second axial ends and a first longitudinal axis defined therethrough, said first axial end of said first piece defining the narrowest diameter of the first piece along the first longitudinal axis, said second piece generally defining a truncated cone having first and second axial ends and a second longitudinal axis defined therethrough, said first axial end of said second piece defining the narrowest diameter of the second piece along the second longitudinal axis, said first and second pieces receivable within the converging and diverging sections, respectively, of the first die such that the first end of the first piece contacts the first end of the second piece;

positioning the first substantially straight portion of each tube on the outer surface of the first piece with the second substantially straight portion of each tube substantially parallel to the first longitudinal axis;

retaining each tube on the outer surface of the first piece;

positioning the diverging section of the first die onto the first substantially straight portion of the tubes, thereby sandwiching the first substantially straight portion of each tube between the first piece and the diverging section of the first die;

forcing the first piece into the diverging section of the first die until each tube is deformed into intimate contact with immediately adjacent tubes along the entire length of the first substantially straight portion thereof;

aligning the second longitudinal axis with the first longitudinal axis and forcing the second piece axially into the converging section of the first die, thereby sandwiching the second substantially straight portions each of the tubes between the inner surface and the outer surface of the second piece;

forcing the second piece axially into the converging section of the first die until each tube is deformed into intimate contact with immediately adjacent tubes along the entire length of the second substantially straight portion thereof;

removing the second piece from the converging section;

marking each of said tubes to identify the position of each tube relative to the other tubes;

removing the first piece from the diverging section;

removing the tubes from the first die;

providing a fixture for bonding the tubes together and positioning each tube onto the fixture in the same relative position the tubes had when removed from the first die, with each tube in intimate contact with each adjacent tube along the length thereof; and maintaining the position of the tubes while bonding each tube to the immediately adjacent tubes, thereby forming a single cooling tube liner.

2. The method of claim 1 wherein said inner surface comprises a fluted surface having a plurality of troughs extending between the first and second axial ends of said first die, said plurality of troughs equal in quantity to the plurality of tubes.

3. The method of claim 2 wherein the outer surface of the first and second pieces is fluted comprising a plurality of troughs extending between the first and second axial ends thereof and equal in quantity to the plurality of tubes, and the step of positioning each tube along the outer surface of the first piece comprises positioning the first substantially straight portion of each tube within one of the troughs of the first piece.

4. The method of claim 3 wherein the step of retaining each tube on the outer surface comprises retaining each tube within one of the troughs of the outer surface of the first piece.

5. The method of claim 4 wherein the step of retaining each tube within one of the troughs of the outer surface comprises providing a first retaining ring removably secured to the second end of the first piece, said first retaining ring having a plurality of retaining pins equal to the quantity of tubes, and each pin received within one end of one of said tubes.

6. The method of claim 5 wherein the step of forcing the second piece axially into the converging section of the first die is immediately preceded by the step of providing a second retaining ring, said second ring removably secured to the second end of the second piece, said second retaining ring having a plurality of retaining pins equal to the quantity of tubes, each pin received within one end of one of said tubes.

7. The method of claim 1 wherein the outer surface of the first and second pieces is fluted comprising a plurality of troughs extending between the first and second axial ends thereof and equal in quantity to the plurality of tubes, and the step of positioning each tube along the outer surface of the first piece comprises positioning the first substantially straight portion of each tube within one of the troughs of the first piece.

8. The method of claim 7 wherein said inner surface comprises a fluted surface having a plurality of troughs extending between the first and second axial ends of said first die, said plurality of troughs equal in quantity to the plurality of tubes.

9. The method of claim 8 wherein the step of retaining each tube on the outer surface comprises retaining each tube within one of the troughs of the outer surface of the first piece.

10. The method of claim 9 wherein the step of retaining each tube within one of the troughs of the outer surface comprises providing a first retaining ring removably secured to the second end of the first piece, said first retaining ring having a plurality of retaining pins equal to the quantity of tubes, and each pin received within one end of one of said tubes.

11. The method of claim 10 wherein the step of forcing the second piece axially into the converging section of the first die is immediately preceded by the step of providing a second retaining ring, said second ring removably secured to the second end of the second piece, said second retaining ring having a plurality of retaining pins equal to the quantity of tubes, each pin received within one end of one of said tubes.

12. A method of forming cooling tube liners for a rocket thrust chamber, said method comprising:

providing a plurality of cooling tubes, each of said plurality of tubes having the same length;

providing a first die having a centerline axis defined therethrough and first and second axial ends, an inner surface facing said centerline axis and extending between said first and second ends, said inner surface defining a diverging section coaxial with the centerline axis;

providing a second die comprising a first piece generally defining a truncated cone having first and second axial ends and a first longitudinal axis defined therethrough, said first piece having first and second axial ends, said first axial end of said first piece defining the narrowest diameter of the first piece along the first longitudinal axis, said first piece having an outer surface extending between the first and second axial ends thereof, said first piece receivable within the diverging section of the first die;

positioning each tube along the outer surface of the first piece, the tube extending between the first and second axial ends of the first piece;

retaining each tube on the outer surface of the first piece;

positioning the diverging section of the first die onto the tubes, thereby sandwiching each tube between the first piece and the diverging section of the first die;

forcing the first piece into the diverging section of the first die until each tube is deformed into intimate contact with immediately adjacent tubes along the entire length thereof;

removing the first die from the first piece;

marking each of said tubes to identify the position of each tube relative to the other tubes;

removing the tubes from the first piece;

providing a fixture for bonding the tubes together and positioning each tube onto the bonding fixture in the same relative position the tubes had when removed from the first die, with each tube in intimate contact with each adjacent tube along the length thereof; and maintaining the position of the tubes while bonding each tube to the immediately adjacent tubes, thereby forming a single cooling tube liner.

13. The method of claim 12 wherein said inner surface comprises a fluted surface having a plurality of troughs extending between the first and second axial ends of said first die, said plurality of troughs equal in quantity to the plurality of tubes.

14. The method of claim 13 wherein the outer surface of the first piece is fluted comprising a plurality of troughs extending between the first and second axial ends thereof and equal in quantity to the plurality of tubes, and the step of positioning each tube along the outer surface of the first piece comprises positioning each tube within one of the troughs of the first piece.

15. The method of claim 14 wherein the step of retaining each tube on the outer surface comprises retaining each tube within one of the troughs of the outer surface of the first piece.

16. The method of claim 15 wherein the step of retaining each tube within one of the troughs of the outer surface comprises providing first and second retaining rings, said first ring removably secured to the first end of the first piece and said second ring removably secured to the second end of the first piece, each of said retaining rings having a plurality of retaining pins equal to the quantity of tubes, and each pin received within one end of one of said tubes.

17. The method of claim 12 wherein the outer surface of the first piece is fluted comprising a plurality of troughs extending between the first and second axial ends thereof and equal in quantity to the plurality of tubes, and the step of positioning each tube along the outer surface of the first piece comprises positioning each tube within one of the troughs of the first piece.

18. The method of claim 17 wherein the step of retaining each tube on the outer surface comprises retaining each tube within one of the troughs of the outer surface of the first piece.

19. The method of claim 18 wherein said inner surface comprises a fluted surface having a plurality of troughs extending between the first and second axial ends of said first die, said plurality of troughs equal in quantity to the plurality of tubes.

20. The method of claim 19 wherein the step of retaining each tube within one of the troughs of the outer surface comprises providing first and second retaining rings, said first ring removably secured to the first end of the first piece and said second ring removably secured to the second end of the first piece, each of said retaining rings having a plurality of retaining pins equal to the quantity of tubes, and each pin received within one end of one of said tubes.

* * * * *